UNITED STATES PATENT OFFICE.

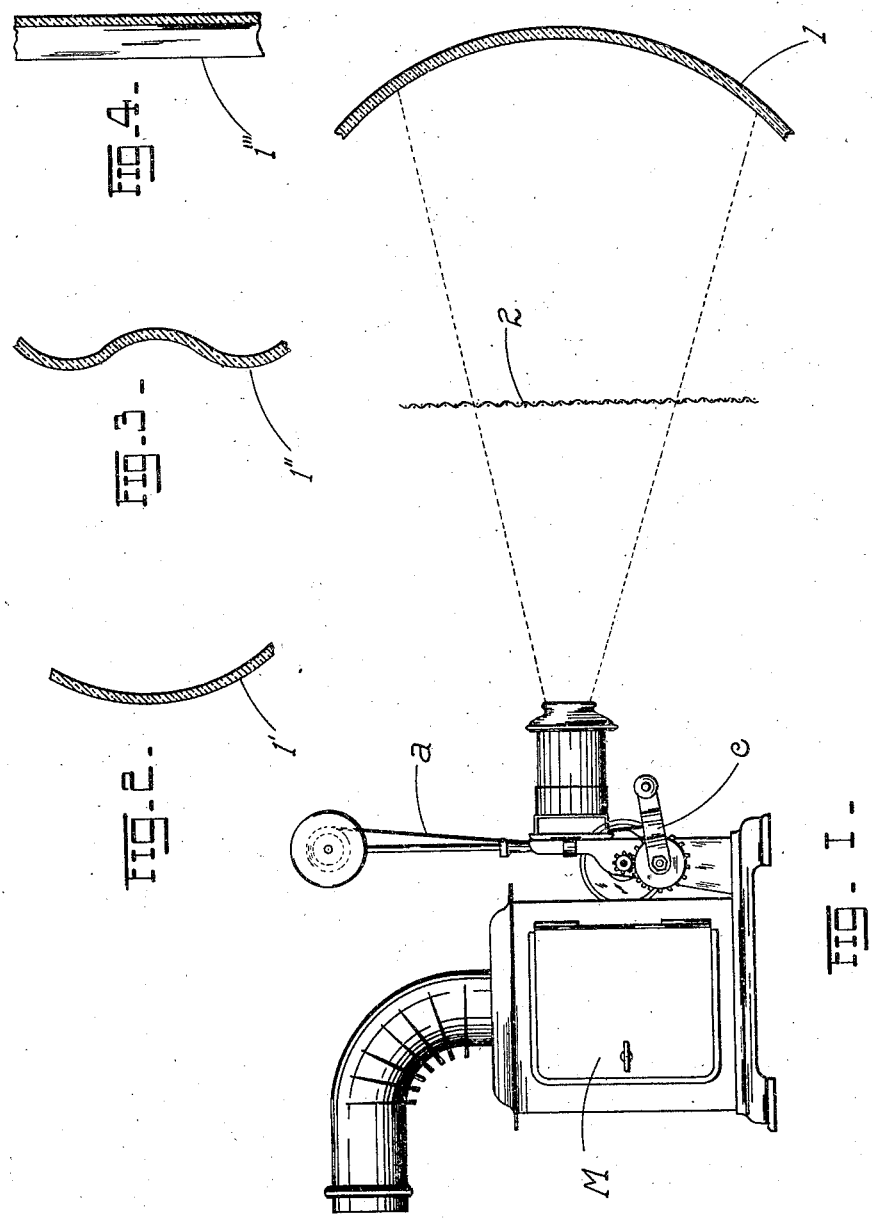

HENRY VOEGE, OF ST. LOUIS, MISSOURI.

MOVING-PICTURE APPARATUS.

938,729.     Specification of Letters Patent.     Patented Nov. 2, 1909.

Application filed February 8, 1909. Serial No. 476,839.

*To all whom it may concern:*

Be it known that I, HENRY VOEGE, citizen of the United States, residing at St. Louis, State of Missouri, have invented certain new and useful Improvements in Moving-Picture Apparatus, of which the following is a full, clear, and exact description, reference being had to the accompanying drawings, forming a part hereof.

My invention has relation to improvements in moving picture apparatus; and it consists in the novel features more fully set forth in the specification and pointed out in the claims.

In the drawings, Figure 1 is a side elevation of a conventional moving picture machine showing the application of my invention; and Figs. 2, 3 and 4 are sectional views of various reflecting surfaces or mirrors onto which the pictures are projected.

It is the usual practice in exhibiting moving pictures to project the same on a screen properly distanced from the lens of the machine by which the light rays are dispersed, the plane surface of the screen showing the pictures or objects in normal and natural proportions.

In order to lend diversity to the amusement thus afforded, it is the object of my invention to project the images or pictures on to a reflecting surface, the configuration of which shall depart from a perfect plane, thereby reflecting the objects in a contorted and grotesque outline, a result quite familiar to persons who have had occasion to stand before a convex or concave mirror, or in fact any mirror whose reflecting surface is not a perfect plane. In the case of a moving picture machine however, the light rays can not be projected directly upon the surface of the glass or mirror, but the light rays must first be filtered through a screen composed of woven cloth or silk, after which in falling on the glass surface they are reflected without injury to the eyes of the observer. The final result is that the pictures reflected by the mirror assume various grotesque and fantastic forms according to the curvature of the surface of the mirror, and considerable amusement is afforded thereby.

The advantages of the invention will be best apparent from a detailed description thereof, which is as follows:—

Referring to the drawings, and for the present to Fig. 1, M, represents an ordinary moving picture machine provided with the picture film $a$ which is advanced by suitable mechanism actuated by the crank-arm $c$ as well understood in the art. The pictures are projected onto a concave mirror 1 after the light rays have been previously filtered through a translucent screen 2 made of closely woven cloth or silk. The filter arrests the intensity of the rays which if let fall directly on the mirror would by reason of their reflection obscure the picture which is supposed to be behind the mirror. In effect the picture may be considered as being first projected on the filter or screen, and as the images appear on the screen they are reflected by the mirror on the same order as if the living person were performing in front of the mirror. Since the surface of the latter departs from a true plane everything seen in the mirror appears distorted.

I do not, of course, wish to limit the surface of the mirror to any particular contour, and in Figs. 2, 3 and 4 I illustrate mirrors $1'$, $1''$, and $1'''$ with convex, wave-like and vertically concave reflecting faces. Of course, any combination of curved surfaces may be employed of which the number is obviously almost infinite.

Having described my invention, what I claim is:—

1. In combination with a moving picture machine, a reflecting receiving surface, and a screen for intercepting a portion of the light and softening its effect, interposed between the surface and the machine.

2. In combination with a moving picture machine, a curved reflecting surface to receive the pictures, and a screen or filter of woven fabric for partially intercepting the light rays.

3. In combination with a moving picture machine, a curved glass or mirror for receiving the pictures, and a screen for intercepting a portion of the light and softening its effect, interposed between the glass and the machine.

In testimony whereof I affix my signature, in presence of two witnesses.

HENRY VOEGE.

Witnesses:
    EMIL STAREK,
    JOS. A. MICHEL.